United States Patent Office

3,255,234
Patented June 7, 1966

3,255,234
PREPARATION OF ACRYLONITRILE FROM HYDROGEN CYANIDE AND ACETYLENE
Harold K. Inskip, Tonawanda, N.Y., assignor to E. I. du Pont de Nemours and Company, Wilmington, Del., a corporation of Delaware
No Drawing. Original application July 24, 1959, Ser. No. 829,191, now Patent No. 3,135,701, dated June 2, 1964. Divided and this application June 26, 1963, Ser. No. 290,629
8 Claims. (Cl. 260—465.3)

This application is a divisional application of my co-pending application Serial No. 829,191, filed July 24, 1959, now U.S. Patent 3,135,701, granted June 2, 1964.

This invention relates to the production of acrylonitrile by the reaction of hydrogen cyanide and acetylene in a non-aqueous liquid catalyst, and is more particularly concerned with an improved process for producing acrylonitrile utilizing an anhydrous cuprous chloride solution incorporating a novel promoter which increases catalytic activity.

The liquid phase production of acrylonitrile is known to require a large investment in equipment. For economical production it is important to obtain high productivity from this equipment. Productivity will be evaluated herein as pounds of acrylonitrile produced per day per cubic foot of catalyst solution, and will be referred to as space-time-yield (STY). It is also important to minimize by-product formation, both to obtain high yields of acrylonitrile and to reduce the amount of unwanted material which must be separated, and disposed of, in the process. Aqueous solutions of cuprous chloride catalyst have commonly been used in the liquid phase process for producing acrylonitrile from acetylene and hydrogen cyanide. Non-aqueous catalyst solutions have recently received attention as a way of reducing the formation of unwanted by-products. These do avoid the formation of certain by-products, such as acetaldehyde and lactonitrile, but difficulties with other by-products have remained, and the rate of production of acrylonitrile has generally been lower than is desirable for an economical process. Non-volatile by-products have been particularly troublesome, as these accumulate in the catalyst composition and seriously reduce the activity of the catalyst, unless their concentration is kept sufficiently low by catalyst replacement. This complex black mixture of non-volatile by-products is commonly designated "tars." It solidifies upon cooling and makes catalyst recovery difficult.

It is an object of this invention to provide an improved non-aqueous cuprous chloride catalyst composition and process for producing acrylonitrile. Another object is to increase the productivity of acrylonitrile obtained with anhydrous cuprous chloride catalyst solution and also obtain a more favorable ratio of acrylonitrile to tars produced. Other objects will become apparent from the specification and claims.

In accordance with the present invention, acrylonitrile is produced at high productivity and yield by reacting acetylene with hydrogen cyanide at 80–150° C. in a non-aqueous liquid reaction medium containing cuprous chloride catalyst dissolved in an organic nitrile solvent and promoted with 0.5–30% of 2,6-dimethylpyrone, based on the weight of liquid reaction medium. The use of the term "liquid reaction medium" herein is to be considered synonymous with the term "catalyst composition." The catalyst is preferably kept active for continuous operation by introducing hydrogen chloride in an amount between about 1% and 20% by weight of the hydrogen cyanide used, and by catalyst replacement to avoid excessive concentration of by-product tars, either continuously or intermittently at suitable intervals. The concentration of tars should not exceed about 30%, and should preferably not exceed 20% by weight of the liquid reaction medium. Since the presence of water contributes to by-product formation, the liquid reaction medium is preferably kept substantially anhydrous by the use of technically dry feeds of acetylene, hydrogen cyanide, and hydrogen chloride, as well as materials used in making up the liquid reaction medium.

The proportions of acetylene and hydrogen cyanide may be varied over a wide range. Molar gas ratios of $C_2H_2$ to HCN in the range of 25:1 to 2:1 are suitable. High ratios are ordinarily undesirable because of the expense of recovering the large amount of unreacted acetylene and recycling it to the process. Low ratios give lower space-time-yields. The most efficient operation is usually at molar ratios in the range of 15:1 to 6:1.

Increasing the rate at which reactants are fed to the liquid reaction medium will increase the space-time-yield until the maximum STY is reached, when further increases merely provide increasing amounts of unreacted feed in the off-gas. Preferably a total flow rate is used which will provide a slight excess of hydrogen cyanide and, of course, a considerable excess of acetylene in the reaction off-gas.

Temperatures of about 100–120° C. and substantially atmospheric pressure are usually best for the reaction. In general, higher temperatures or higher pressures give higher space-time-yields of acrylonitrile but are less favorable with respect to the ratio of acrylonitrile to by-products; lower temperatures give lower space-time-yields and increase the difficulty of maintaining a fluid, homogeneous liquid medium containing a high concentration of cuprous chloride catalyst. The temperature should be high enough to vaporize the acrylonitrile product, which boils at 78° C. under atmospheric pressure. Lower pressures can be used, but the additional expense of vacuum operation usually makes this undesirable.

Increasing the concentration of cuprous chloride catalyst in the catalyst composition usually results in correspondingly higher space-time-yields without adverse effect on the acrylonitrile to by-product ratio. Previous patents have been concerned with providing good solvents for cuprous chloride which are inert under the reaction conditions and do not cause a decline in space-time-yield in continuous operation. A number of organic liquids are known to be good solvents for cuprous chloride when used with substantial amounts of solubilizer salts, such as ammonium chloride or amine hydrochlorides, but these compositions are much less desirable than solvents which do not require solubilizer salts. The large amount of ammonium chloride or similar salt, often a molecular equivalent of the amount of cuprous chloride, results in precipitation during the reaction with attendant mechanical difficulties, such as plugging of gas or vapor inlets to the reactor. Amine hydrochlorides have been found to catalyze by-product formation, particularly of tars.

The organic nitriles, as a class, have been found to be suitable solvents for solubilizing cuprous chloride without the use of solubilizer salts. Of these, the hydrocarbon nitriles of up to two nitrile groups, and the corresponding fluorine, chlorine or bromine substituted hydrocarbon nitriles, of molecular weight 69 to 165 are preferred, especially benzonitrile, o-tolunitrile and adiponitrile. Other particularly good cuprous chloride solvents of this class include phenylpropionitrile, tetrahydrobenzonitrile, isobutyronitrile, valeronitrile, β-chloropropionitrile, methoxypropionitrile, crotononitrile, succinonitrile, and glutaronitrile. The solvent should, of course, be a stable liquid at the reaction temperature, and should boil at a higher temperature than the acrylonitrile, preferably above 100° C. at atmospheric pressure, so that the product can be vaporized from the liquid medium without excessive evaporation of the solvent taking place. Preferably the liquid reaction medium will contain at least 30% by weight of cuprous chloride in solution, although solvents in which cuprous chloride is less soluble can be used when lower space time-yields are satisfactory.

In view of the above considerations, it is highly unexpected to find that the addition of 2,6-dimethylpyrone, a non-solvent for cuprous chloride, greatly increases the catalyst activity. The example given below is illustrative of the advantages of the invention discussed above. It shows an improvement in the space-time-yield of acrylonitrile produced with only 5% by weight of dimethylpyrone promoter in the liquid catalyst medium which is over 6 times the value obtained without this promoter under otherwise identical conditions. This astonishing improvement is obtained without unfavorable effect on the acrylonitrile/by-product ratio. In fact, the production of acrylonitrile is actually increased to a greater extent than the rate of by-product tar formation, resulting in less tar formation per 100 parts of acrylonitrile produced.

The following example, in which percentages are by weight unless otherwise indicated, illustrates a specific embodiment of the invention:

*Example*

A reaction vessel was partially filled with a liquid reaction medium which initially consisted of 35% cuprous chloride, 60% benzonitrile and 5% 2,6-dimethyl-4-pyrone. The liquid reaction medium was maintained at 100° C. throughout the run by a heat transfer jacket surrounding the reaction vessel and provided with suitable temperature controls. Acetylene, hydrogen cyanide, and hydrogen chloride were fed into the liquid raction medium in the molar ratio of 15:1:0.06. The total gas flow was adjusted so that about 5% of the hydrogen cyanide remained unreacted after passing through the liquid reaction medium. The gas was introduced so as to bubble upwards through the liquid reaction medium for a distance of about 3 feet, which provided adequate time for mixing and reaction. After a brief start-up period to reach equilibrium operating conditions, the run was continued for 40 hours. During this time the space-time-yield averaged 33 lbs. acrylonitrile/cu. ft. of catalyst solution/day, at a yield of over 90% based on the hydrogen cyanide used. The average rate of tar formation was 2.9 lbs./100 lbs. of acrylonitrile by weight. The tar dissolved in the liquid reaction medium and some evaporation of solvent occurred. The composition of the catalyst also changed due to the formation of cyanides, the catalyst composition analyzing 5.5–8.6% cuprous cyanide during most of the run. At the end of this time, when adjustment of the composition of the liquid reaction medium was desirable before continuing, the run was terminated.

A comparison run was made under the same conditions except that the dimethylpyrone promoter was omitted. In this case the space-time-yield averaged 5 lbs. acrylonitrile/cu. ft. of catalyst solution/day and the rate of tar formation was 6 lbs./100 lbs. of acrylonitrile. Therefore, the promoter increased the STY by a factor of 6.6, and reduced the rate of tar formation/100 lbs. of acrylonitrile to less than 50% of the unpromoted rate.

Since many different embodiments of the invention may be made without departing from the spirit and scope thereof, it is to be understood that the invention is not limited by the specific illustrations except to the extent defined in the following claims.

I claim:

1. The process for producing acrylonitrile comprising passing hydrogen cyanide and an excess of acetylene into an anhydrous catalytic solution of cuprous chloride, an organic nitrile having a boiling point at atmospheric pressure above the boiling point of acrylonitrile being the essential component for dissolving the cuprous chloride, and from 0.5% to 30%, based on the weight of said solution, of 2,6-dimethylpyrone as a catalyst promoter, said solution being maintained on the acid side and at a temperature between 80 and 150° C.

2. A process as defined in claim 1 wherein hydrogen chloride is introduced into said solution in an amount between about 1% and 20% by weight of the hydrogen cyanide used.

3. A process as defined in claim 1 wherein the molar ratio of acetylene-hydrogen cyanide is in the range of 25:1 to 2:1.

4. A process as defined in claim 2 wherein the reaction is conducted at 100–120° C. and substantially atmospheric pressure.

5. The process of claim 4 wherein the molar ratio of acetylene to hydrogen cyanide is in the range of 15:1 to 6:1 and cuprous chloride is present in an amount of at least 30% by weight of said solution.

6. The process of claim 5 in which said organic nitrile is benzonitrile.

7. The process of claim 5 in which said organic nitrile is o-tolunitrile.

8. The process of claim 5 in which said organic nitrile is adiponitrile.

References Cited by the Examiner

UNITED STATES PATENTS

| | | | |
|---|---|---|---|
| 2,798,882 | 7/1957 | Christopher et al. | 260—465.3 |
| 2,798,884 | 7/1957 | Christopher et al. | 260—465.3 |
| 2,920,098 | 1/1960 | Burrus et al. | 260—465.3 |

CHARLES B. PARKER, *Primary Examiner.*